United States Patent [19]

Draper

[11] 4,208,704

[45] Jun. 17, 1980

[54] LAMP REFLECTOR FOR A MOTOR VEHICLE

[75] Inventor: Geoffrey R. Draper, Lichfield, England

[73] Assignee: Lucas Industries Limited, Birmingham, England

[21] Appl. No.: 914,658

[22] Filed: Jun. 12, 1978

[30] Foreign Application Priority Data

Jun. 17, 1977 [GB] United Kingdom ............... 25424/77

[51] Int. Cl.[2] ............................ F21V 7/00; B60Q 1/00

[52] U.S. Cl. ....................................... 362/297; 362/61; 362/346; 362/350

[58] Field of Search ........................ 362/61, 64, 80, 83, 362/297, 341, 346, 347, 348, 350

[56] References Cited

U.S. PATENT DOCUMENTS

| | | | |
|---|---|---|---|
| 2,074,626 | 3/1937 | Strange | 362/346 |
| 2,258,875 | 10/1941 | Arras | 362/346 |
| 3,184,591 | 5/1965 | Cibie | 362/61 |
| 3,688,149 | 8/1972 | Pitkjaan | 362/346 |
| 3,914,593 | 10/1975 | Laribe | 362/297 |
| 4,125,890 | 11/1978 | Nixon | 362/348 |

*Primary Examiner*—Samuel W. Engle
*Assistant Examiner*—Donald P. Walsh
*Attorney, Agent, or Firm*—Ladas, Parry, Von Gehr, Goldsmith & Deschamps

[57] ABSTRACT

A vehicle headlamp reflector comprises a dished body having a generally rectangular front opening and a bulb-receiving rear opening. The body is internally reflective and includes a first pair of laterally disposed reflective portions, a second pair of laterally disposed reflective portions, an upper reflective portion and a lower reflective portion. The portions are disposed inwardly of the respective portions, are on opposite sides of the opening and between the portions. The portions lie on the same paraboloidal surface while the portions lie on a different paraboloidal surface. The two paraboloid surfaces have common axes and common foci but the focal length of the paraboloidal surface in respect of the portions is less than the other paraboloidal surface.

10 Claims, 10 Drawing Figures

Figure 5:
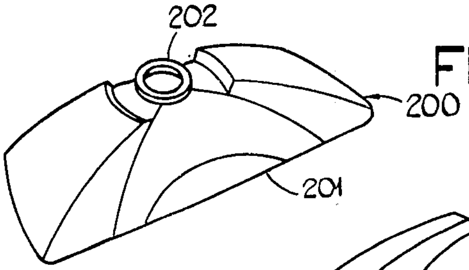

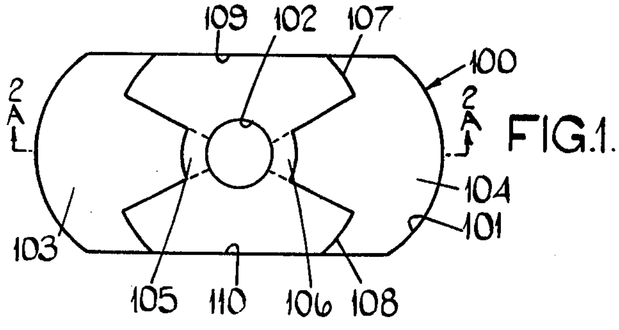
FIG.1.
FIG.2.
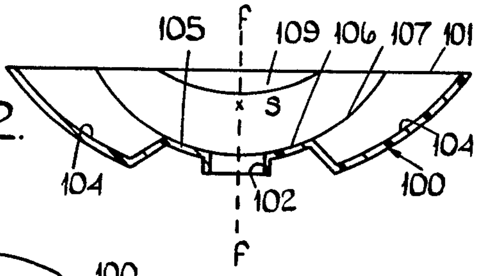
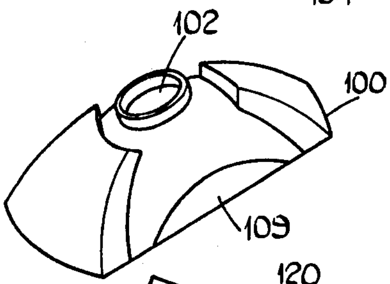
FIG.3.
FIG4
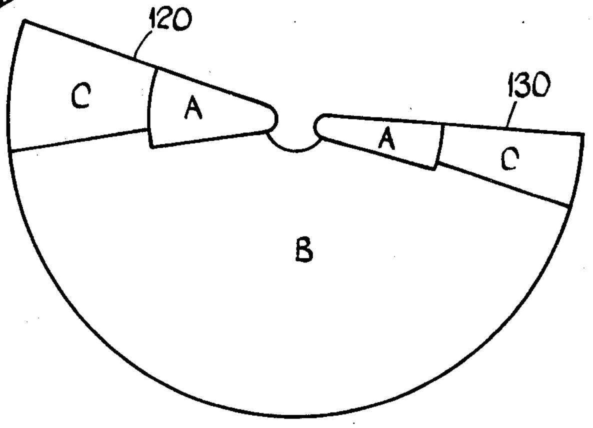

LAMP REFLECTOR FOR A MOTOR VEHICLE

This invention relates to a lamp reflector for a motor vehicle and particularly, to a lamp reflector for use in a headlamp assembly for a motor vehicle.

According to the present invention, there is provided a lamp reflector for a motor vehicle comprising a dished body having a non-circular e.g. generally rectangular, front opening through which, in use, light passes and a rear opening for receiving a light source, e.g. a bulb, and a reflective surface within the body, said reflective surface including (a) a pair of first reflective portions disposed respectively on opposite sides of the rear opening to extend laterally of the body towards the front opening and being spaced from the rear opening, (b) a pair of second reflective portions disposed between the respective first reflective portions and the rear opening, and (c) a third reflective portion disposed above the rear opening between the pair of first reflective portions, each of said second and third reflective portions having a focal length which is less than that of each of the first reflective portions.

Preferably, the second and third reflective portions have the same focal length and are homofocal, i.e. their foci are coincident.

The focus or foci of the second and third reflective portions may be coincident with that of each of the first reflective portions although it is within the scope of the present invention for them to be mutually spaced apart axially and/or laterally of the dished body. It is also within the scope of the present invention for the focal axes of the reflective portions to be coincident or to be mutually inclined.

In a preferred embodiment, the reflective surface includes a fourth reflective portion disposed below the rear opening and between the pair of first reflective portion.

The fourth reflective portion may have the same focal length as the second and third reflective portions and may also have its focus coincident with or behind the focus of at least one of the second and third reflective portions or it may have a focal length which is greater than that of at least one of the second and third reflective portions but which is less than that of at least one of the first reflective portions.

Any of the reflective portions may (1) be paraboloidal or (2) lie on a surface defined by rotating a curve lying on a non-circular conic section having a focus (e.g. a parabola or an ellipse) about an axis which passes through the focus and which is inclined at an acute angle to the focal axis of the curve. In this latter respect, attention is drawn to our copending British Patent Application No. 17989/77 filed on Apr. 29th 1977 which describes in more detail the advantages of this form of shape in producing a sharper image cut-off. The disclosure of the abovementioned copending British Patent Application is incorporated herein by reference. In one embodiment, the first, second and third reflective portions have shape (2) above and the fourth reflective portion, when provided, is paraboloidal, i.e. has shape (1) above.

The expressions "front," "rear," "above," "below" and "laterally" are used herein to define the various parts when the lamp reflector is disposed in an orientation in which it is intended to be used.

Figure 6:
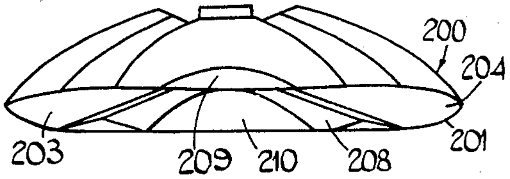
Figure 7:
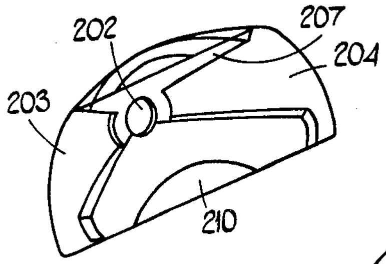
Figure 8:
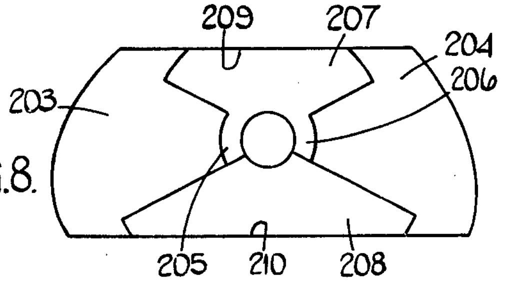

Embodiments of the present invention will now be described, by way of example, with reference to the accompanying drawing, in which:

FIG. 1 is a front view of one form of lamp reflector according to the present invention, FIG. 2 is a section on the line 2—2 of FIG. 1, FIG. 3 is a perspective view of the rear of the reflector of FIGS. 1 and 2, FIG. 4 is a schematic representation of an unlensed beam pattern projected by the lamp reflector of FIG. 1 to 3 fitted with a shielded lamp filament, FIGS. 5 to 7 are various perspective views from different angles of another form of lamp reflector according to the present invention, FIG. 8 is a front view of the reflector of FIGS. 5 to 7, FIG. 9 is a cross-sectional view of the reflector of FIGS. 5 to 8, and FIG. 10 is a longitudinal sectional view of the reflector of FIGS. 5 to 9.

Referring now to FIGS. 1 to 3 of the drawings, the lamp reflector illustrated therein is injection moulded from a low profile, thermosetting polyester dough moulding composition and comprises a dished body 100 having a front opening 101 and a rear opening 102. As can be seen from FIG. 1, the front opening 101 is non-circular and, in this embodiment, is generally rectangular. The internal surface of the body 100 is lacquered and vacuum aluminised so as to render it reflective. The internal reflective surface comprises a pair of first reflective portions 103, 104, and a pair of second reflective portions 105, 106, a third reflective portion 107, and a fourth reflective portion 108. The first and second reflective portions 103 and 104 are paraboloidal and lie on the same paraboloidal surface. These portions 103 and 104 have a focal axis f—f and a focus S (see FIG. 2). The first and second reflective portions 103 and 104 extend laterally of the lamp reflector respectively on opposite sides of the rear opening 102, are spaced therefrom and extend to the front opening 101. The second, third and fourth reflective portions 105 to 108 are paraboloidal, lying on the same paraboloidal surface. The paraboloidal on the surface of which the reflective portions 105 to 108 lie has a focal length which is less than that of the first reflective portions 103 and 104. However, the focal axes and focal point of the second, third and fourth reflective portions 105 to 108 are coincident with those of the first reflective portions 103 and 104.

The second reflective portions 105 and 106 are disposed between the respective first reflective portions 103 and 104 and the rear opening 102. The third reflective portion 107 extends from the rear opening 102 to the front opening 101 and is disposed above the rear opening 102 and between the first and second reflective portions 103 and 104. In a like manner, the fourth reflective portion 108 extends from the rear opening 102 to the front opening 101 below the rear opening 102 and between the first reflective portions 103 and 104. At the top and bottom of the reflector body 100 there are provided a pair of nonreflective, planar portions 109, 110 which extend parallel to the focal axis f—f.

In a typical example, the mutually facing edges of the second and third reflective portions subtend an angle of 40°-60° at the focal axis f—f, the focal length of the first reflective portions 103 and 104 is 30-40 mm, the focal length of the second, third and fourth reflective portions 105 to 108 is 15–20 mm, the diameter of the rear opening is 20–45 mm, the diameter of the reflective surface laterally of the reflector, i.e. in the region of the first reflective portions 103 and 104 is 200–300 mm, and the first reflective portions 103 and 104 have an inner diameter of 40–90 mm.

As will be apparent from FIG. 1, the rear opening 102 is completely surrounded by portions of shorter focal length and the portions of longer focal length are only provided laterally of the reflector.

In use, a bulb, e.g. an H4 quartz halogen bulb, is disposed in the rear opening 102 so that a passing, or dipped beam filament thereof lies with its axis on the focal axis f—f and with the rear end of the filament spaced a short distance in front of the focus S. A driving beam filament of the bulb is disposed as near as possible to the focus S but, because it has to be some distance behind passing beam filament for manufacturing reasons, it is disposed behind the focus S. The passing beam filament is masked in the usual way to provide an inclined cut-off to the top of the beam projected by the reflector. The basic passing beam pattern projected by the reflector of FIGS. 1 to 3 as described hereinabove is illustrated in FIG. 4. In this beam pattern, mutually inclined cut-off portions 120 and 130 are defined by the mask in the usual way, the contribution of the beam pattern projected by the fourth portion 108 being blocked out by the mask and only being used when the lamp reflector is being used to project a driving or main beam pattern using driving beam filament in the bulb. Portions A of the beam pattern of FIG. 4 are the contributions provided by the first reflective portions 103 and 104. The portion B corresponds to that provided by the third reflective portion 107. The portions C of the beam pattern of FIG. 4 are those provided by the second reflective portions 105 and 106. The portions A are high intensity portions whilst the portions B and C are relatively even, low intensity portions.

It is to be appreciated that, in accordance with usual practice, the front opening 101 of the lamp reflector will be covered in use by a transparent lens element which serves to produce changes in the basic beam pattern to provide the required intensities of illumination at the desired points in the final passing beam pattern. However, the basic beam pattern as illustrated in FIG. 4 approaches that required in the passing beam after lensing so that only a minimal amount of lensing is required. In fact, all that is required is to move the portions A of relatively high intensity to the centre of the beam to produce one area of maximum illumination and a kink point at the junction of the cut-offs 120 and 130 and to spread the low intensity illumination from portion B to produce the necessary beam width. This requires a much lower spreading of the basic beam pattern (approximately 10° as opposed to at least 30° required with a conventional reflector arrangement) and is the reason why a minimal amount of lensing is required.

This reduction in the degree of lensing required has particular advantage when a beam is to be produced through a lens element which is inclined to the optical axis. Normally, this presents severe problems associated with high spread values as the extremes of the beam become depressed as the top of the beam takes on a curved line instead of remaining straight. This curved spread normally produces difficulties in achieving the illumination values necessary for a satisfactory beam performance. However, due to the lower order of spread required on the above-described reflector arrangement, the degree of curvature of the beam is reduced to acceptable levels. A further benefit of the simplified lensing system is obtained when a fixed lens element is employed. In certain designs, the lens element is required to be fixed relative to the motor vehicle rather than fixed relative to the reflector body and the beam is adjusted by tilting the reflector body independently of the lens element. Because the beam from the reflector will consequently move across the lens element as the angle of inclination of the reflector is varied, the lensing on the lens element has to be maintained as simple as possible to accommodate the resulting compromise in design. The reflector described hereinabove has the advantage that a reduced compromise is required in view of the simple lens system. Thus, an improved beam distribution can be achieved.

The relatively low intensity portions C, as contributed by the second reflective portions 105 and 106, are provided in order to contribute to the outer edges of the dipped beam and provide illumination to cover nearside and offside verges of the road. This contribution will also exhibit a sharp light cut-off which coincides with the cut-off provided by the first reflective portions 103 and 104. This has the effect of extending the cut-off lines and so aids alignment of the dipped beam on beam setting equipment commonly in use.

The above-described lamp reflector is particularly suitable for use where it is necessary, for motor vehicle styling purposes, to provide the lamp reflector in an aperture whose height and/or depth is restricted. The light collection characteristics of a rectangular reflector are a function of the focal length, the diameter of the front and rear openings, and the angle subtended by the top and bottom planar portions 109 and 110. The provision of the reflector portions of shorter focal length increases the angle subtended by the planar portion 109 and 110 and therefore improves the collection characteristics in the case where the reflector has to be of a design such that the areas extending laterally of the reflector body (i.e. the areas occupied by the first reflective portion 103 and 104) are only a relatively small proportion of the total reflector area.

Under driving beam conditions, the fourth reflective portion 108 is brought into use since the driving beam filament, rather than the passing beam filament is illuminated. Under these conditions, the driving beam filament although it gives acceptable results, is not situated in the best possible place relative to the large reflector because siting the passing beam filament is more important and it is not possible, fur bulb design limitations, to site both filaments in their ideal locations. A better compromise, in this respect, is provided by the lamp reflector of FIGS. 5 to 10 of the drawings.

Referring now to FIGS. 5 to 10 of the drawings, the lamp reflector illustrated therein is similar to that of FIGS. 1 to 3 in that it is injection moulded from a low profile, thermosetting polyester dough moulding composition and is subsequently internally lacquered and aluminised to render the internal surface reflective. The lamp reflector comprises a dished body 200 having a front opening 201 and a rear opening 202 therein. The reflective surface in the body 200, like the reflector of FIGS. 1 to 3, has a pair of laterally extending first portions 203, 204, a pair of second reflective portions 205, 206, a third reflective portion 207 and a fourth reflective portion 208.

Figure 9:
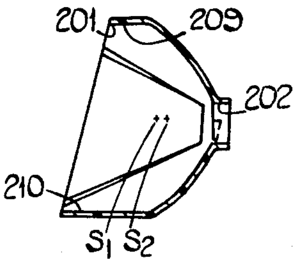
Figure 10:
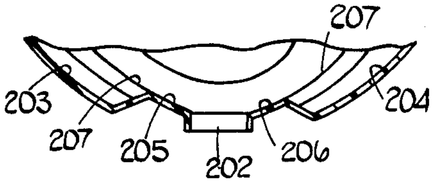

As can be seen from FIG. 9, the lamp reflector illustrated in FIGS. 5 to 10 is intended to be used in conjunction with a lens element (not shown) which is inclined upwardly with respect to a normal to the axis of the reflector body 200. Planar portions 209 and 210 are provided on the reflector body 200 and correspond to the planar portions 109 and 110 of the embodiment of FIGS. 1 to 3.

The first reflective portions 203 and 204, and the second and third reflective portions 205, 206 and 207, respectively, each lie on the surface defined by rotating a curve lying on an ellipse about an axis which passes through the inner focus of the ellipse and which is inclined at an acute angle to the focal axis of the ellipse.

The first reflective portions 203 and 204 lie on the same surface with the inner focal point thereof at $S_1$. The focal length of the first reflective portions 203 and 204 is greater than that of the second and third reflective portions 205, 206 and 207. However, the inner focal point of the second and third reflective portions 205, 206 and 207, respectively, lies at $S_1$, i.e. coincident with the focal point of the first reflective portions 203 and 204. The axis of rotation of the curve which is rotated to define the surface upon which the reflective portions 205 to 207 lie, lies on the focal axis of the first reflective portions 203 and 204. The fourth reflective portion 208 may lie on a surface defined by rotating an ellipse about an axis which passes through the inner focus of the ellipse and which is inclined at an acute angle to the focal axis of the ellipse. However, in this embodiment, the fourth reflective portion 208 is paraboloidal. The focus of the paraboloid defining the fourth reflective portion 208 lies at $S_2$ (see FIG. 9) which is disposed 1–5 mm behind $S_1$ on the focal axis of the first reflective portions 203 and 204. The above-described shape of the second, third and fourth reflective portions 205 to 208 enables a sharp cut-off to be provided for the reasons given in the above mentioned co-pending British patent application No. 17989/77. The splitting of the fourth reflective portion 208 from the second and third reflective portions 205 and 207 makes for efficient use of the fourth reflective portion when the lamp reflector is being used for driving beam purposes.

This is because the focal point $S_2$ can be arranged to lie at the centre of the driving beam filament since the passing beam filament will be disposed with its rear end slightly forward to the focal point $S_1$ which is itself disposed forwardly of focal point $S_2$. As will be apparent to a person skilled in the art, this represents the best possible siting of the driving beam filament with respect to the fourth reflective portion 208 so that the light pattern from the fourth reflective portion is optimised.

It is to be appreciated that the fourth reflective portion 208 will not be used under passing beam condition because of the use of the masked passing beam filament.

It will also be appreciated, of course, that under driving beam condition, the first, second and third reflective portion will be employed in addition to the fourth reflective portion under driving beam conditions.

I claim:

1. A lamp reflector for a motor vehicle comprising a dished body having a non-circular front opening through which, in use, light from the reflector passes, a rear opening for receiving a light source, and a dished reflective surface within the body, said dished reflective surface including (a) a pair of first reflective portions disposed respectively on opposite sides of the rear opening but spaced outwardly therefrom, (b) a pair of second reflective portions disposed between the respective first reflective portions and the rear opening, each of said first reflective portions extending laterally of the lamp reflector continuously from the respective second reflective portion to an outer edge of said dished reflective surface, and (c) a third reflective portion disposed above the rear opening between the first reflective portions, said third reflective portion extending from the rear opening to said outer edge of said dished reflective surface, and each of said second and third reflective portions having a focal length which is less than that of each of the first reflective portions.

2. A lamp reflector as claimed in claim 1, wherein the second and third reflective portions have the same focal length and are homofocal.

3. A lamp reflector as claimed in claim 1 or 2, wherein the focus or foci of the second and third reflective portions is coincident with that of each of the first reflective portions.

4. A lamp reflector as claimed in claim 1, wherein the reflective surface includes a fourth reflective portion disposed below the rear opening and between the pair of first reflective portions.

5. A lamp reflector as claimed in claim 4, wherein the fourth reflective portion has the same focal length as that of each of the second and third reflective portions.

6. A lamp reflector as claimed in claim 4 or 5, wherein the fourth reflective portion has its focus coincident with or behind the focus of at least one of the second and third reflective portions.

7. A lamp reflector as claimed in claim 4, wherein the fourth reflective portion has a focal length which is greater than that of at least one of the second and third reflective portions but which is less than that of at least one of the first reflective portions.

8. A lamp reflector as claimed in claim 7, wherein the fourth reflector has a focal length which is greater than that of each of the second and third reflective portions but which is less than that of each of the first reflective portions.

9. A lamp reflector as claimed in claim 1, wherein at least one of the reflective portions is paraboloidal.

10. A lamp reflector as claimed in claim 1, wherein at least one of the reflective portions lies on a surface defined by rotating a curve lying on a non-circular conic section having a focus about an axis which passes through the focus and which is inclined at an acute angle to the focal axis of the curve.

* * * * *